(12) United States Patent
Kien et al.

(10) Patent No.: US 6,721,352 B2
(45) Date of Patent: Apr. 13, 2004

(54) METHOD AND DEVICE FOR DETECTING THE PRESENCE OF A CARRIER SIGNAL TRANSMITTED IN THE REVERSE RF PATH

(75) Inventors: Thai-Bao H. Kien, Norcross, GA (US); Jiening Ao, Suwanee, GA (US); Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/213,051

(22) Filed: Aug. 6, 2002

(65) Prior Publication Data

US 2004/0028122 A1 Feb. 12, 2004

(51) Int. Cl.$^7$ .................. H04L 25/00; H04B 17/02; H04B 17/00
(52) U.S. Cl. .................. 375/216; 375/213; 375/224
(58) Field of Search ................. 375/216, 211, 375/212, 213, 214, 215, 224, 219, 221; 725/121, 123, 125, 149

(56) References Cited

U.S. PATENT DOCUMENTS

| 5,088,111 A | * | 2/1992 | McNamara et al. ......... 375/18 |
| 5,765,097 A | * | 6/1998 | Dail ......................... 455/5.1 |
| 5,796,503 A | | 8/1998 | Junginger et al. .......... 359/125 |
| 5,809,395 A | * | 9/1998 | Hamilton-Piercy et al. .. 455/4.1 |
| 6,137,607 A | | 10/2000 | Feldman et al. ............ 359/125 |
| 6,160,990 A | * | 12/2000 | Kobayashi et al. .......... 455/5.1 |
| 6,321,384 B1 | * | 11/2001 | Eldering ..................... 725/125 |
| 6,598,232 B1 | * | 7/2003 | McAlear ..................... 725/126 |

OTHER PUBLICATIONS

Scientific-Atlanta, Inc. Pending Application Ser. #09/840,753, Atty. Docket #A-7193, Filing Date: Apr. 23, 2001, Title: "Burst-Mode Analog Transmitter," Inventors: Lamar E. West, Jr. and Donald C. Sorenson.

* cited by examiner

*Primary Examiner*—Stephen Chin
*Assistant Examiner*—Sam K. Ahn

(57) ABSTRACT

The present invention provides an improved apparatus and method for detecting a reverse carrier signal. The present invention utilizes a peak detector/envelope filter for determining the peak level of the reverse analog waveform. The peak level is compared to a threshold level during a predetermined time period to determine the presence of a valid reverse carrier signal. Once determined, an enable signal is provided to an electronics device that allows further transmission of the reverse signals.

4 Claims, 6 Drawing Sheets

METHOD AND DEVICE FOR DETECTING THE PRESENCE OF A CARRIER SIGNAL TRANSMITTED IN THE REVERSE RF PATH

RELATED APPLICATIONS

The subject matter of this invention is related to application Ser. No. 10/026,283 entitled "HFC Reverse Path using an Intelligent Dynamic Switch" of which was filed on Dec. 21, 2001, application Ser. No. 09/840,753 entitled "Burst-Mode Analog Transmitter" of which was filed on Apr. 23, 2001, and application Ser. No. 09/840,767 entitled "Burst-Mode Digital Transmitter" of which was filed on Apr. 23, 2001, all of which are assigned to the assignee hereof, and the teachings of which are hereby incorporated by reference herein in their entirety.

FIELD OF THE INVENTION

This invention relates generally to broadband communications systems, such as cable television networks, and more specifically to a carrier-detect device that detects the presence of a carrier signal that is transmitted in the reverse path of the broadband communications system.

BACKGROUND OF THE INVENTION

FIG. 1 is a block diagram illustrating an example of one branch of a conventional broadband communications system, such as a two-way hybrid/fiber coaxial (HFC) network, that carries optical and electrical signals. Such a network may be used in a variety of systems, including, for example, cable television networks, voice delivery networks, and data delivery networks to name but a few. The communications system 100 includes headend equipment 105 for generating forward, or downstream, signals (e.g., voice, audio, video, or data signals) that are transmitted to subscriber equipment 145. Initially, the forward signals are transmitted as optical signals along a first communication medium 110, such as a fiber optic cable. In most networks, the first communication medium 110 is a long haul segment that carries light having a wavelength in the 1550 nanometer (nm) range. The first communication medium 110 carries the forward signal to hubs 115, which include equipment that transmits the optical signals over a second communication medium 120. In most networks, the second communication medium 120 is an optical fiber that is designed for shorter distances, and which carries light having a wavelength in the 1310 nm range.

From the hub 115, the signals are transmitted to an optical node 125 that converts the optical signals to radio frequency (RF), or electrical, signals. The electrical signals are then transmitted along a third communication medium 130, such as coaxial cable, and are amplified and split, as necessary, by one or more distribution amplifiers 135a–c positioned along the communication medium 130. Taps 140 further split the forward signals in order to provide signals to subscriber equipment 145, such as set-top terminals, computers, telephone handsets, modems, televisions, etc. It will be appreciated that only one branch of the network connecting the headend equipment 105 with the plurality of subscriber equipment 145 is shown for simplicity. However, those skilled in the art will appreciate that most networks include several different branches connecting the headend equipment 105 with several additional hubs 115, optical nodes 125, amplifiers 135a–c, and subscriber equipment 145.

In a two-way network, the subscriber equipment 145 generates reverse RF signals, which may be generated for a variety of purposes, including e-mail, web surfing, pay-per-view, video-on-demand, telephony, and administrative signals from the set-top terminal. These reverse RF signals are typically in the form of modulated RF carriers that are transmitted upstream through the reverse path to the headend equipment 105. The reverse electrical signals from various subscribers are combined via the taps 140 and passive electrical combiners (not shown) with other reverse signals from other subscriber equipment 145. The combined reverse electrical signals are amplified by one or more of the distribution amplifiers 135a–c and typically converted to optical signals by the optical node 125 before being provided to the headend equipment 105. It will be appreciated that in the electrical, or RF, portion of the network 100, the forward and reverse electrical signals are carried along the same coaxial cable 130. In contrast, the forward and reverse optical signals on the first and second communications media 110, 120 are usually carried on separate optical fibers.

The reverse RF carrier signals are generally transmitted within a frequency range from 5 MHz to, for example, 42 MHz. FIG. 2 illustrates a typical reverse band and the frequencies allocated to various services that may be used by the subscriber equipment 145 for the purpose of sending reverse carrier signals. It will be appreciated that the combined reverse carrier signals may include a plurality of reverse carrier signals from a plurality of subscriber equipment. The combined carrier signals may also include a variety of signals in a plurality of frequencies. In addition to the carrier signals, noise and interference is often present in the system. Typically, the noise signals can be viewed with test equipment as essentially a constant level, or noise floor, that most particularly affects the reverse path signals. Disadvantageously, the noise signals interfere with the processing of the valid carrier signals by the headend equipment.

When necessary, the presence of carrier signals in the reverse path is typically detected among the noise signals by examining the instantaneous power level of the RF signal. For example, if the power level of the RF signal is above a predetermined threshold for a predetermined amount of time, e.g., at least 2 microseconds during any 8-microsecond window, the RF signal is treated as a valid RF carrier signal. Otherwise the reverse signal is treated as just noise and interference. This carrier-detect scheme works adequately for narrowband noise that has a predictable noise floor; however, wideband noise, which has a high peak to average power ratio in the time domain, can exceed the predetermined threshold for 2 microseconds in an 8-microsecond window even though its average power level is low. Disadvantageously, the conventional carrier-detect devices allow the transmission of noise signals more than desired.

The present invention is, therefore, directed to an improved carrier-detect circuit that detects a valid reverse carrier signal while significantly limiting the transmission of undesirable noise signals. As a result, the HFC network's reverse path signaling capacity, quality, and reliability are greatly enhanced.

BRIEF DESCRIPTION OF THE DRAWINGS

FIG. 3 illustrates a block diagram of a communications device including an intelligent dynamic switch with a carrier-detect device in accordance with the present invention that detects the presence of a carrier signal.

DETAILED DESCRIPTION OF A PREFERRED EMBODIMENT

Figure 1:
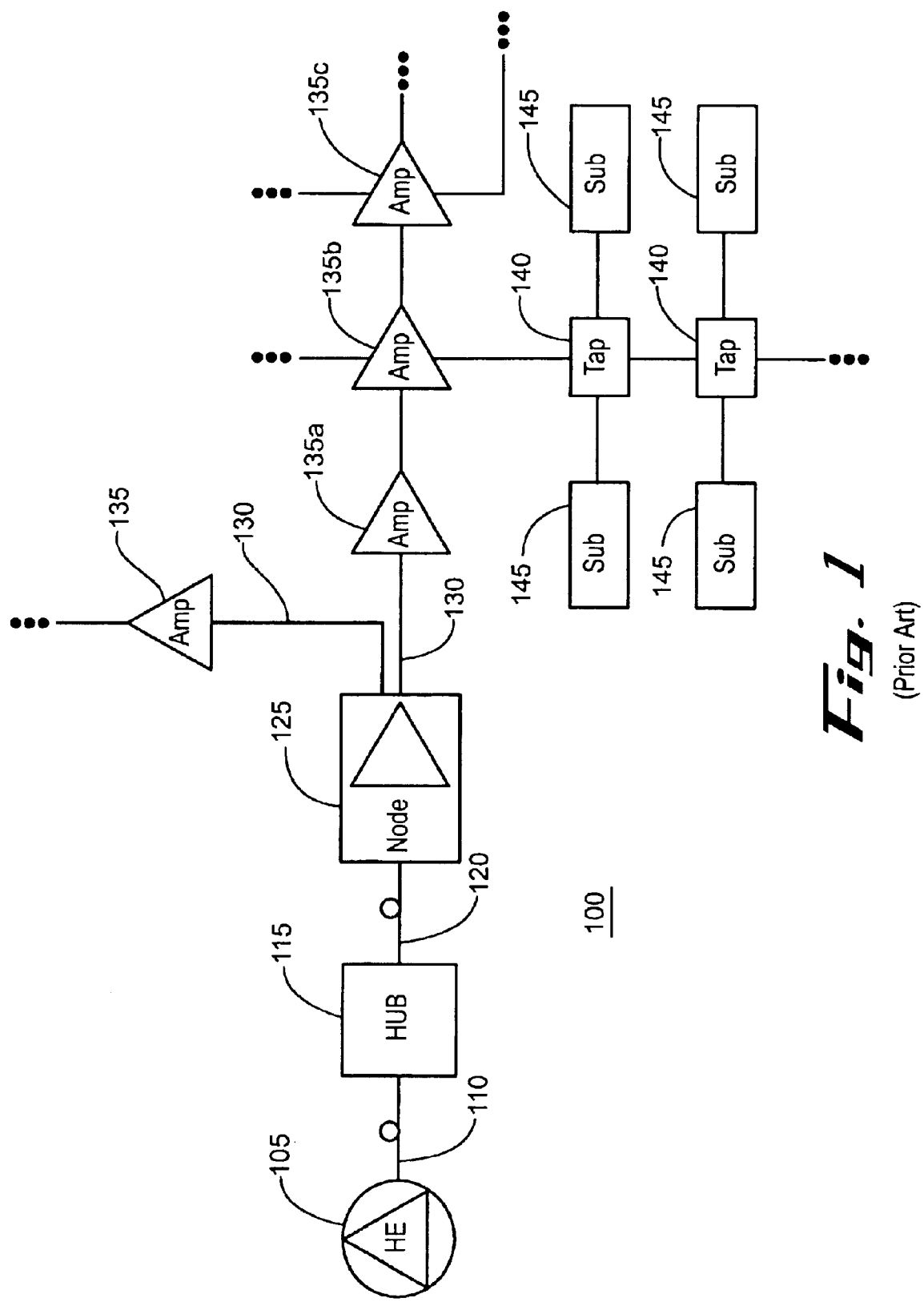
FIG. 1 illustrates an example of one branch of a conventional broadband communications network, such as a two-way HFC cable television network, that carries optical and electrical signals.

The present invention will be described more fully hereinafter with reference to the accompanying drawings in which like numerals represent like elements throughout the several figures, and in which exemplary embodiments of the invention are shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. For example, the present invention is included in the intelligent dynamic switch. The dynamic switch may be included in a tap or an amplifier. The present invention, however, can also be included in the burst-mode analog transmitter as described in co-pending, commonly assigned, patent application Ser. No. 09/840,753, the teachings of which are hereby incorporated by reference. Furthermore, the present invention can be included in the burst-mode digital transmitter as described in co-pending, commonly assigned, patent application Ser. No. 09/840,767, the teachings of which are incorporated by reference. Moreover, although the reverse RF carrier signals are typically modulated with data signals originating at the subscriber equipment, these RF carrier signals could also include additional types of signal modulation, such as voice or video. The present invention is described more fully hereinbelow.

Intelligent Dynamic Switch (IDS)

Generally described, an intelligent dynamic switch (IDS) in accordance with the present invention reduces the problem of reverse ingress by allowing a reverse signal to proceed further along the reverse path only if a desired reverse signal is present. The IDSs will be deployed at a variety of points in the network. If an IDS determines that no desired reverse signal is present at that point in the network, it will prevent the transmission of any reverse signal, thereby preventing the transmission of reverse noise signals beyond that point in the network.

FIG. 3 illustrates a block diagram of a communications device including the IDS with a carrier-detect device in accordance with the present invention. The carrier-detect device detects the presence of carrier signals included in the reverse RF signals. The basic elements of an exemplary IDS are shown in the block diagram of FIG. 3. The concept proposed herein uses an intelligent switch to allow transmission of reverse RF signals only when the carrier-detect device 360 detects a reverse RF carrier signal. As shown in FIG. 3, there are five main elements related to the IDS 300. They are:

1) Optionally, converting reverse RF signals received at the IDS 300 to digital signals that represent the received RF signals.

2) Detecting when a reverse RF carrier signal is present (either prior to or subsequent to digitizing the reverse analog signals).

3) Delaying or buffering the digital signals.

4) Releasing the buffered signals only when at least one RF carrier signal is present.

5) Converting the digital signals back to analog signals.

FIG. 3 illustrates an embodiment in which the IDS 300 is included within a conventional communications device 305, such as a tap or amplifier. When the communications device 305 is used in the RF distribution network, forward and reverse signals are typically transmitted through the device 305. In this manner, diplex filters 310, 315 are used to separate the forward and reverse signals. A high pass filter isolates the forward signals, which are typically within a band that ranges from 50 MHz to 870 MHz, and provides the forward signals to conventional forward path elements 320 associated with the communication device 305. The forward signals then pass through diplex filter 315 before being transmitted further downstream in a conventional manner.

Reverse signals received at diplex filter 315 are filtered via a low pass filter and provided to the IDS 300. The reverse RF signals are passed from the IDS 300 to conventional reverse path elements 325 only after the carrier-detect device 360 determines that there is a valid RF carrier signal present within the reverse RF signals. A low pass filter in diplex filter 310 isolates the reverse signals from the forward signals and allows transmission upstream. It will be appreciated that the IDS 300 can also be a stand-alone product so long as appropriate diplex filters are used to isolate the forward and reverse signals in a two-way network.

In accordance with the operation described above, the IDS 300 only allows transmission of reverse RF signals when an RF carrier signal is present. This effectively blocks the transmission of noise signals until such time as the IDS 300 allows the reverse RF signals to pass through. Significantly, this device and method reduces the ingress signals that conventionally are transmitted and aggregated continuously through the reverse path and are received at the headend, and is discussed in further detail below.

An Exemplary Embodiment of an Intelligent Dynamic Switch

As illustrated in FIG. 3, an embodiment of an IDS 300 includes an analog-to-digital (A/D) converter 350, a data buffer 355, a carrier-detect device 360, and a digital-to-analog (D/A) converter 365. A description of the primary elements of the IDS 300 follows.

Analog-to-Digital Converter—350/Digital-to-Analog Converter—365

The A/D converter 350 receives a reverse RF signal that includes a composite of one or more reverse RF carrier signals. The reverse RF signals originate with one or more of the subscribers that are located downstream from the communication device 305. Those skilled in the art will appreciate that if the communication device 305 is a tap, the number of subscribers downstream from the tap may be as few as two or four, and that if the communication device 305 is an amplifier, the number of subscribers downstream from the amplifier may be as high as several thousand. Those skilled in the art will also appreciate that the reverse band is typically from 5 MHz to 42 MHz in U.S. cable television networks, and from 5 MHz to 65 MHz in European cable television networks.

Figure 2:
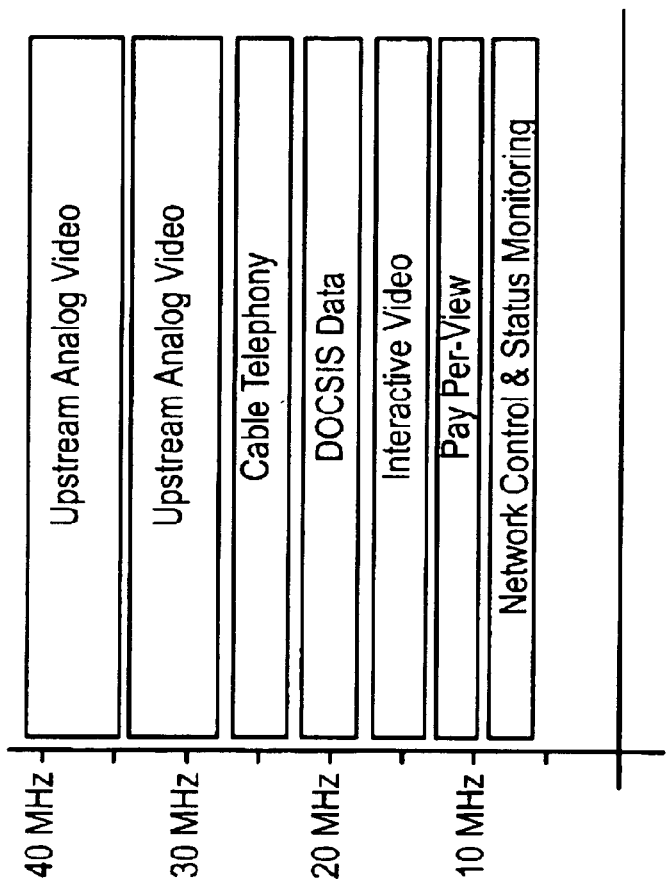
FIG. 2 illustrates a typical reverse band and the frequencies allocated to various services that may be used by the subscriber equipment for the purpose of sending reverse carrier signals.

The composite RF signal received at the A/D converter 350 will include RF carrier signals if any of the subscriber equipment located downstream is sending signals back to the headend. The nature of the reverse service signals being transmitted back to the headend for processing depend upon the services that employ the reverse path, such as impulse pay-per-view (IPPV), video on demand, cable modem signals, etc. Commonly, carrier signals for different reverse services are sent in independent frequency bands as shown in FIG. 2.

It will be appreciated that digitization of an analog signal is known in the telecommunications industry and others, for example, as a means of converting a single baseband video or voice signal to a digital signal format. The conversions for these single signals, however, are accomplished using an A/D converter having a very low sampling rate. In contrast, reverse broadband communications signals used in a broadband cable television network require a significantly higher sampling rate. Those skilled in the art will be familiar with the Nyquist theory, which states an analog signal must be sampled at a frequency that is greater than twice the maximum signal bandwidth in order to ensure that all information can be extracted and the inherent aliasing will not corrupt the original signal. In a conventional HFC communications network, the A/D and D/A converters operate with a sampling clock of typically 100 MHz with a packet size of 10 or 12-bits. The need for a sampling rate of 100 Megasamples per second (Ms/s), which is essentially equivalent to a 100 MHz sampling clock, is determined by understanding that the reverse RF bandwidth in the U.S. ranges from 5 MHz to 42 MHz. The sampling rate, therefore, should be no less than 84 Ms/s, and is typically increased to 100 Ms/s because a practical anti-aliasing filter requires some transition bandwidth. A sampling rate of 150 Ms/s is used for a reverse band ranging from 5 MHz to 65 MHz. The higher sampling rate substantiates the requirement of more robust and complex A/D and D/A converters to digitize the entire bandwidth of the HFC reverse path broadband signals compared to that required for a single signal.

Accordingly, the A/D converter 350 receives the reverse RF signals and digitizes the received RF signal, or waveform, producing a signal that is represented by, for example, ten parallel digital bits. The digital output of the A/D converter 350 is then provided to data buffer 355.

An Exemplary Embodiment of an improved Carrier-Detect Device—360

The present invention is directed towards an improved carrier-detect device 360 that is suitable for use in the IDS 300 of FIG. 3. The main function of the carrier-detect device 360 in accordance with the present invention is to accurately determine the presence of at least one desired RF carrier signal within the entire received reverse bandwidth (e.g., 5 MHz to 42 MHz) while actively eliminating the transmission of noise signals when carrier signals are not present. In accordance with the present invention, the improved carrier-detect device 360 determines if a reverse carrier signal is present by analyzing the envelope of the signal rather than conventionally analyzing the carrier signal itself. Advantageously, the improved carrier-detect device 360 extends the detection time in order to distinguish between a carrier signal and a noise signal having a very high power level, while also lowering the electronic component requirement. More specifically, a carrier signal is conventionally detected by analyzing the reverse signal over short durations of time, for example, 2 microseconds. When the power level of the carrier signal is determined to be high during this 2-microsecond duration, a carrier signal is determined to be present. As mentioned, however, the high power level may not be a valid carrier signal and may just be an increased level of noise signals resulting in an error in the detection of a carrier signal. By extending the detection time from 2 microseconds to, for example, 10 to 20 microseconds, previously detected noise signals are significantly minimized. More specifically, a minimum valid DOCSIS burst signal carries 16 byes of data and the burst duration is approximately 12.5 microseconds for a 2.56 Mbps rate. The detection time in accordance with the present invention can, therefore, be extended from 2 microseconds to 10 microseconds and still adequately detect the presence of a carrier signal.

Figure 4:
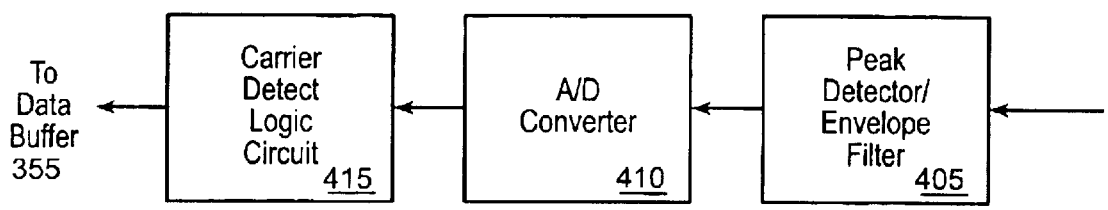
FIG. 4 illustrates the carrier-detect device in accordance with the present invention that is suitable for use in the intelligent dynamic switch of FIG. 3.

FIG. 4 illustrates the improved carrier-detect device 360 in accordance with the present invention. An exemplary embodiment of the carrier-detect device 360 includes a peak detector/envelope filter 405; an A/D converter 410; and a carrier-detect logic circuit 415.

Figure 5:
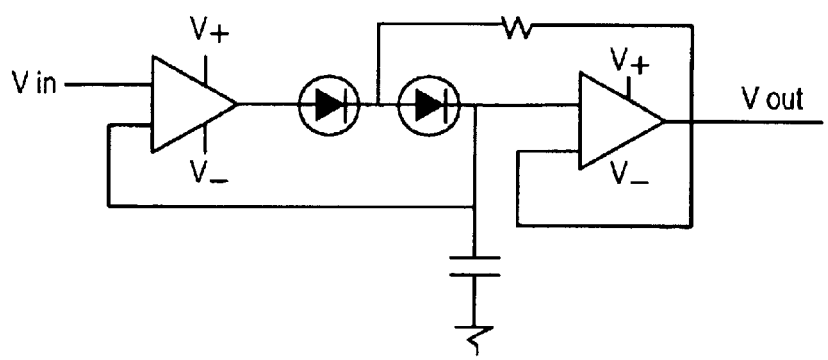
FIG. 5 is a block diagram of an example peak detector/envelope filter that is suitable for use in the carrier-detect device of FIG. 4.
Figure 6:
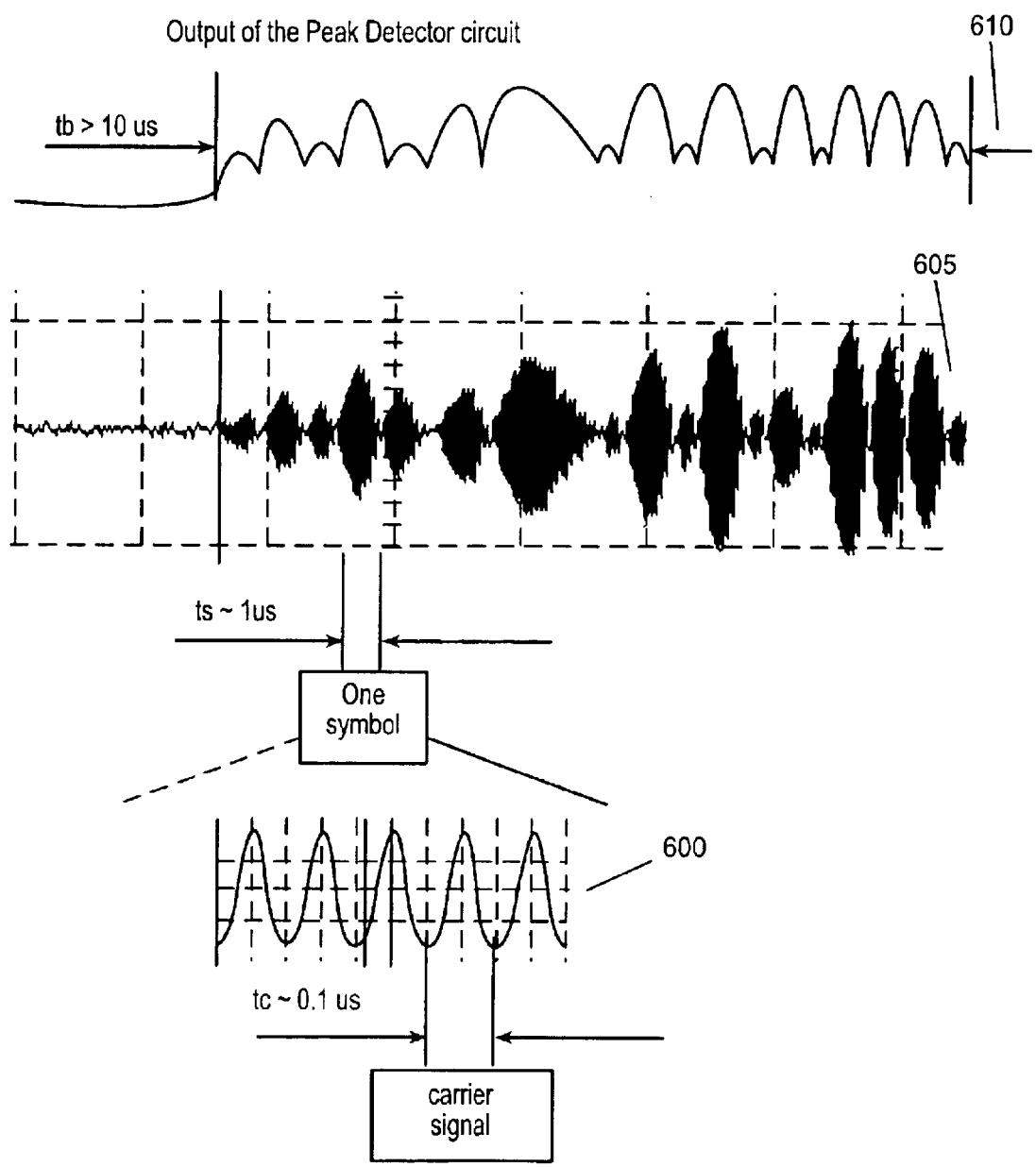
FIG. 6 is an illustration of a reverse RF signal displayed by a spectrum analyzer.
Figure 7:
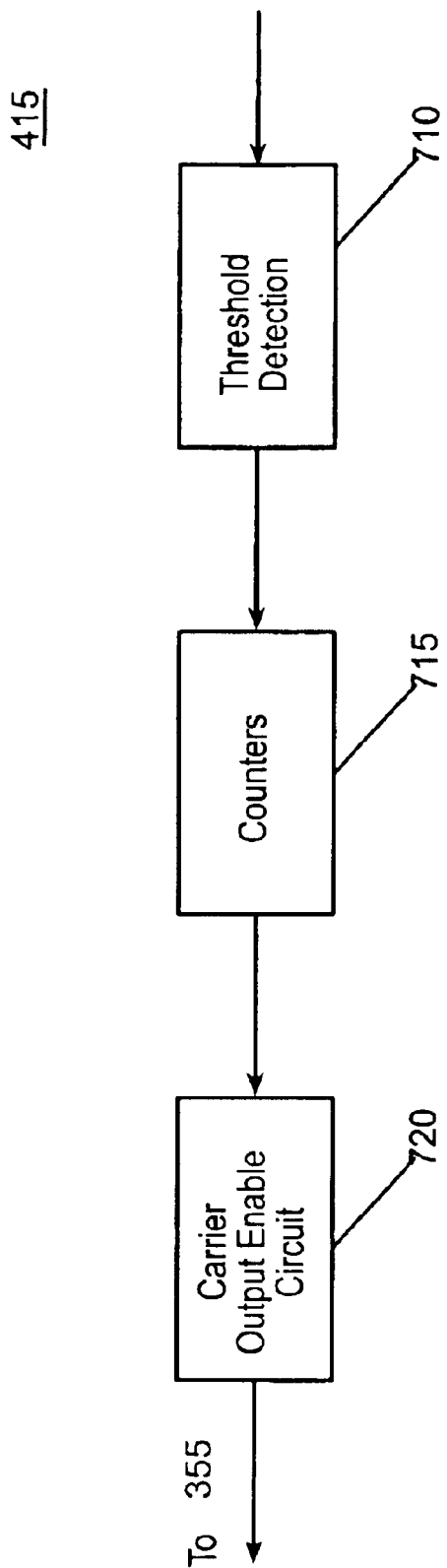

FIG. 5 is an example of a block diagram of the peak detector/envelope filter 405 that is suitable for use in the carrier-detect device 360. Accordingly, the present invention detects the presence of a valid carrier signal by analyzing the symbols, or envelope, of the carrier signal instead of by the power level of the carrier signal itself. FIG. 6 illustrates a reverse RF signal displayed by a spectrum analyzer. Graph 600 displays a typical reverse signal including carrier signals. As mentioned,, the reverse signal itself is conventionally analyzed to detect the presence of a carrier signal. Symbols are displayed in graph 605. A symbol comprises reverse signals during a period of time. The carrier-detect device 360 of the present invention essentially analyzes the symbols of the reverse signal. The output of the peak detector/envelope filter 405 is displayed in graph 610. As shown, 10 microseconds of envelope signals in graph 610 comprise 10 microseconds of peak-detected symbols of graph 605, which comprise 10 microseconds of carrier signals shown in graph 600. It will be appreciated that the detection time can vary. Importantly, the carrier-detect device 360 of the present invention extends the detection time in comparison with conventional methods as shown in FIG. 6, thereby allowing valid carrier signals to be detected while eliminating detection errors of high-power noise signals that occur during a short duration time.

Referring again to FIG. 5, the values of the capacitor and resistor should be chosen to correspond with a predetermined carrier-signal detection time, for example, from 10 microseconds to 20 microseconds. It will also be appreciated that there are several ways to implement a circuit that detects the peak voltage of the input waveform and filters out all extraneous signals.

Referring again to FIG. 4, the A/D converter 410 receives the filtered peak envelope signal and digitizes the received signal. The A/D converter 410 may utilize, for example, 20 MHz 8-bit sampling. It will be appreciated that since the envelope signal provided by the peak detector/envelope filter 405 corresponds to a much lower frequency in comparison with the received analog signals, the A/D converter 410 required is less complex, thereby rendering the use of a much less expensive converter. It will also be appreciated that the sampling frequency and number of bits are arbitrary and are not intended to limit the scope of the invention. The digitized signal is subsequently provided to the carrier-detect logic circuit 415.

Figure 7:
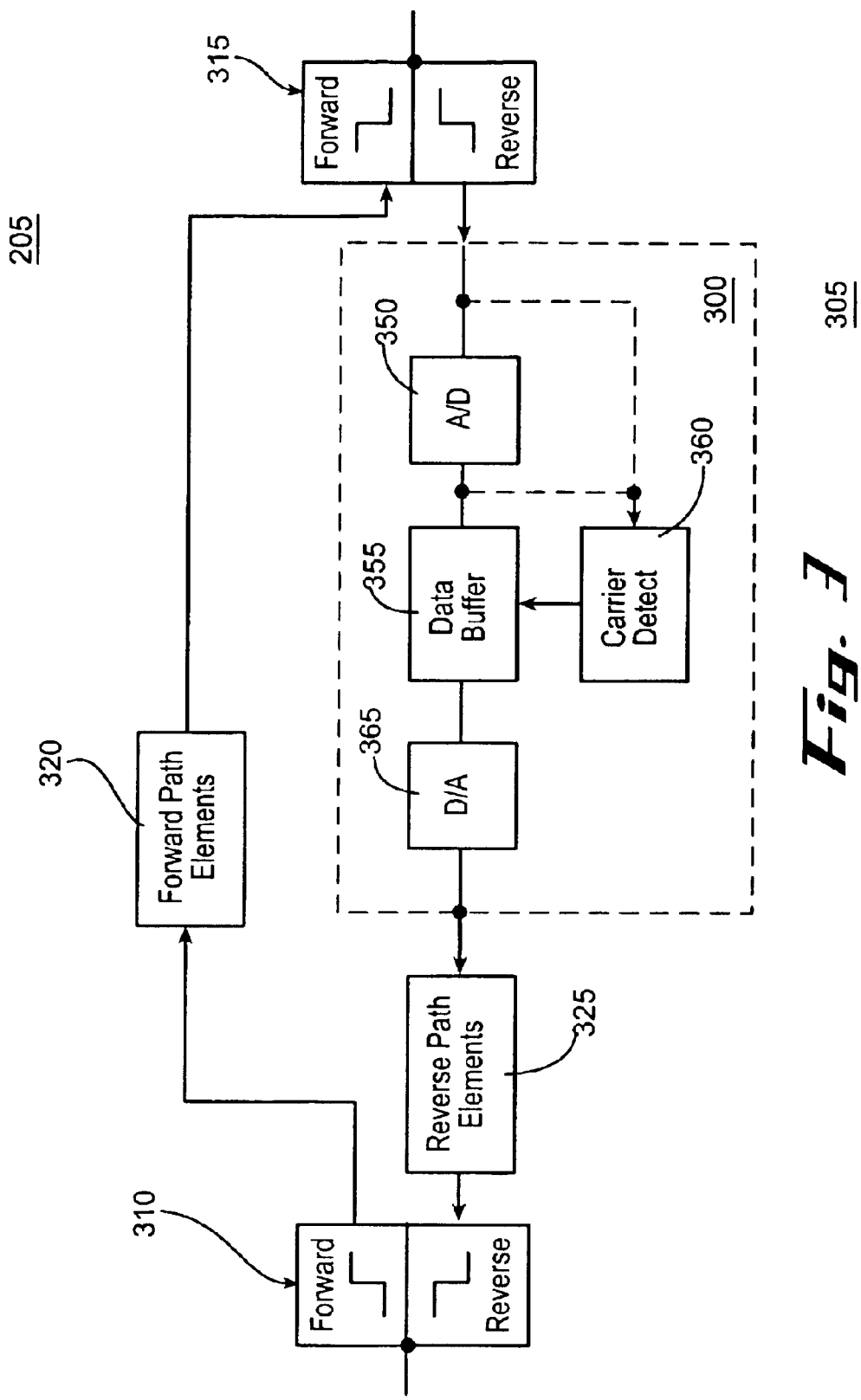
FIG. 7 is a block diagram illustrating an exemplary embodiment of a carrier-detect logic circuit that is suitable for use in the carrier-detect device of FIG. 4.

FIG. 7 is a block diagram illustrating an embodiment of the carrier-detect logic circuit 415. A threshold detection circuit 710 determines whether the digitized carrier envelope has exceeded a predetermined threshold level during the detection time (i.e., 10 to 20 microseconds). Counters 715 count the duration of the "carrier envelope detected to be above the threshold level". Accordingly, the counters 715 enhance the filtering out of spurious noise signals that are at times seen on the carrier envelope. When the carrier envelope exceeds the predetermined threshold level then carrier output enable circuit 720 is set high and an enable signal is provided to a data buffer 355 (FIG. 3). Subsequently, the delayed reverse signals are allowed to pass through the dynamic switch 300.

Data Buffer—355

Data buffers are well known in the art and are easily designed depending upon their application. A low-cost digital data buffer that uses registers or random access memory (RAM) introduces a delay that is necessary to give the carrier-detect device 360 sufficient time to detect the presence of a desired RF carrier signal. In a preferred embodiment of the digital data buffer 355, a 10-bit 800 samples stage first-in-first-out (FIFO) delay line 355 is used to introduce the delay. Once an RF carrier signal is detected, the carrier-detect device 360 controls the data buffer 355 to allow the delayed digital signals to pass through. The digital signals are provided to the D/A converter 365 where they are converted back to analog RF signals for processing by the conventional reverse path elements 325.

From the foregoing description, it will be appreciated that the present invention provides an improved apparatus and method for detecting the presence of a valid carrier signal. The improved carrier-detect device 360 takes into consideration the potential for validating invalid carrier signals, such as when noise signals are of great duration and power level.

The present invention has been described in the relation to particular embodiments, which are intended in all respects to be illustrative rather than restrictive. For example, although the present invention has been described in the context of the intelligent dynamic switch, those skilled in the art will understand that the principles of the present invention may be applied to, and embodied in, communications devices that detect the presence of reverse carrier signals. In addition, the present invention need not be limited to the reverse path.

Alternative embodiments will become apparent to those skilled in the art to which the present invention pertains without departing from its spirit and scope. Accordingly, the scope of the present invention is defined by the appended claims rather than by the foregoing description.

What is claimed is:

1. In a communications system for transmitting forward and reverse signals, the reverse signals including carrier signals and noise signals, the communications system including a dynamic switch, the dynamic switch comprising:

an input port for receiving a first reverse signal from a first portion of the communications system, wherein the first reverse signal is represented as an analog waveform;

an analog-to-digital converter for converting the first reverse signal to a digital signal, the digital signal including a plurality of digital bits;

a carrier-detect device coupled to the input port for detecting the presence of at least one carrier signal, the carrier-detect device comprising:

a peak detector for detecting a peak level of the analog waveform and for providing a peak envelope signal;

an analog-to-digital converter for digitizing the peak envelope signal; and a carrier-detect logic circuit for determining whether the digitized peak envelope signal includes the at least one carrier signal by comparing the digitized peak envelope signal to a threshold power level during a detection period and for providing an enable signal when the at least one carrier signal is detected; and a buffer for temporarily storing the plurality of digital bits and for outputting the plurality of digital bits when the enable signal is received;

a digital-to-analog converter for receiving the plurality of digital bits from the buffer and for converting the plurality of digital bits into a second reverse signal corresponding to the first reverse signal; and an output port for providing the second reverse signal to a second portion of the communications system.

2. The dynamic switch of claim 1, the carrier-detect logic circuit comprising:

a threshold detector for comparing the digitized peak envelope signal to the threshold power level;

a counter for providing a number in accordance with the digitized peak envelope signal above the threshold power level during the detection period; and a carrier output enable circuit for providing the enable signal when the number of the digitized peak envelope signal above the threshold power level exceeds a predetermined number.

3. In a communications system having forward and reverse paths for transmitting forward and reverse signals, respectively, the reverse signals including carrier signals and noise signals, the communications system including a communications device, the communications device including:

a first diplex filter having a high pass filter and a low pass filter, the high pass filter for isolating the forward signals, and the low pass filter for isolating the reverse signals;

forward path elements coupled to the high pass filter of the first diplex filter for processing;

a second diplex filter having a high pass filter and a low pass filter, the high pass filter coupled to the forward path elements for providing the processed forward signals to the forward path, and the low pass filter for receiving reverse signals;

a dynamic switch coupled to the low pass filter of the second diplex filter, the dynamic switch comprising:

digitizing means for converting a reverse signal to a digital signal having a predetermined number of digital bits;

detecting means for detecting when at least one reverse carrier signal is present in the reverse signal, wherein the reverse signal is represented as an analog waveform, the detecting means comprising:

a peak detector for detecting a peak level of the analog waveform and for providing a peak envelope signal;

an analog-to-digital converter for digitizing the peak envelope signal; and a carrier-detect logic circuit for determining whether the digitized peak envelope signal includes the at least one carrier signal by comparing the digitized peak envelope signal to a threshold power level during a detection period and for providing an enable signal when the at least one carrier signal is detected; and a buffer for delaying the plurality of digital bits and for releasing the delayed plurality of digital bits in response to the enable signal; and converting means for converting the delayed plurality of digital bits back to the reverse signal; and reverse path elements coupled to the dynamic switch for processing and for providing the processed reverse signal to the low pass filter of the first diplex filter, whereby upon detection of the at least one reverse carrier signal, the reverse signal is provided to the reverse path elements.

4. The communications system of claim 3, wherein the carrier-detect logic circuit comprises:

a threshold detector for comparing the digitized peak envelope signal to the threshold power level;

a counter for providing a number in accordance with the digitized peak envelope signal above the threshold power level during the detection period; and a carrier output enable circuit for providing the enable signal when the number of the digitized peak envelope signal above the threshold power level exceeds a predetermined number.

* * * * *